United States Patent [19]

Hatamura

[11] Patent Number: 4,712,431

[45] Date of Patent: Dec. 15, 1987

[54] MULTI-AXIS LOAD SENSOR

[76] Inventor: Yotaro Hatamura, 12-11, Kohinata 2-chome, Bunkyo-ku, Tokyo 112, Japan

[21] Appl. No.: 867,221

[22] Filed: May 27, 1986

Related U.S. Application Data

[63] Continuation of Ser. No. 605,212, Apr. 30, 1984, Pat. No. 4,628,745.

[30] Foreign Application Priority Data

Sep. 14, 1983 [JP] Japan .................................. 58-168385

[51] Int. Cl.⁴ ................................................ G01L 5/16
[52] U.S. Cl. .................................................. 73/862.04
[58] Field of Search ........... 73/862.04, 862.05, 862.06, 73/147

[56] References Cited

U.S. PATENT DOCUMENTS 3,867,838  2/1975  Gerresheim .
4,178,799  12/1979  Schmieder et al. .
4,478,089  10/1984  Aviles et al. .
4,485,681  12/1984  Hatamura .

OTHER PUBLICATIONS

F. W. Grigg et al., "Wheel Force Transducers", Conference on Stress and Strain in Engineering, Brisbane, Australia, (23—23 Aug. 1973), pp. 170-175.

Primary Examiner—Charles A. Ruehl
Attorney, Agent, or Firm—Oblon, Fisher, Spivak, McClelland, & Maier

[57] ABSTRACT

A multi-axis load sensor comprises at least one radial plate structure adapted to detect a moment to be produced about its standard axis by a load, and at least one of a parallel plate structure adapted to detect a force to be produced in the direction of its standard axis by the load and another radial plate structure adapted to detect a moment to be produced about its standard axis by the load. The standard axis of the former radial plate structure is neither coincident with nor parallel to the standard axis of the at least one of the parallel plate structure and latter radial plate structure. The above sensor can reduce interactions of detected signals to extremely low levels, while showing good detection sensitivity and large strength and rigidity and making detection characteristic linear.

33 Claims, 28 Drawing Figures

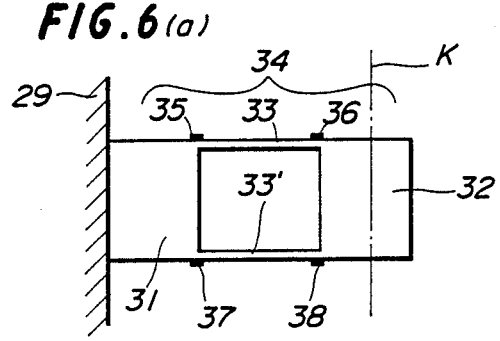
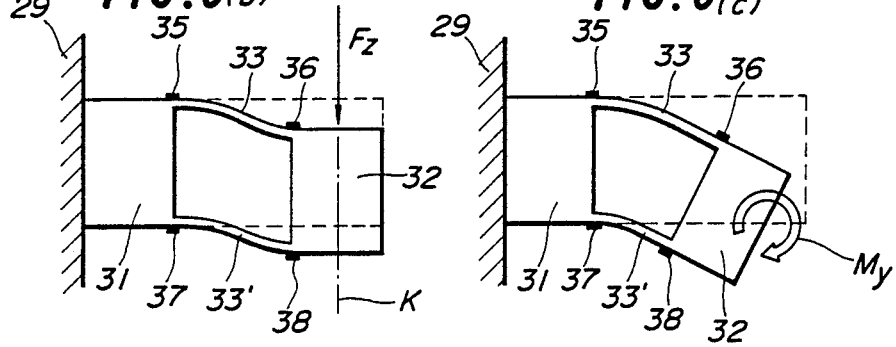
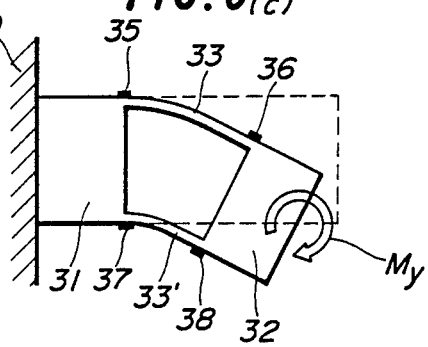
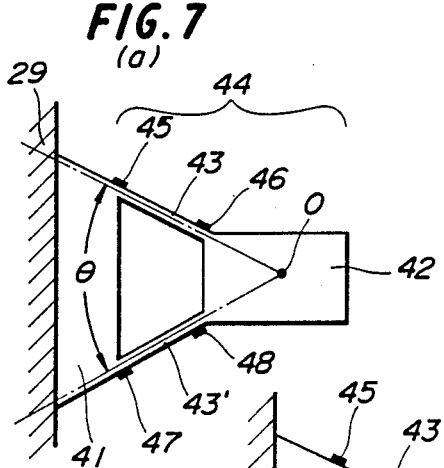
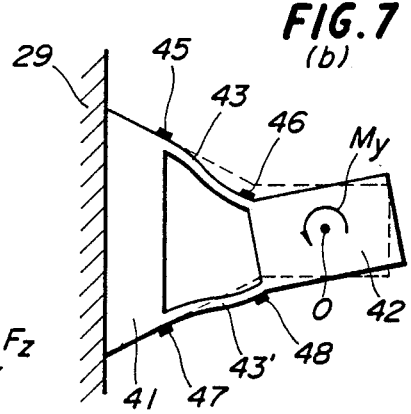
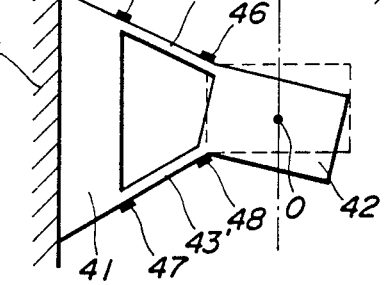

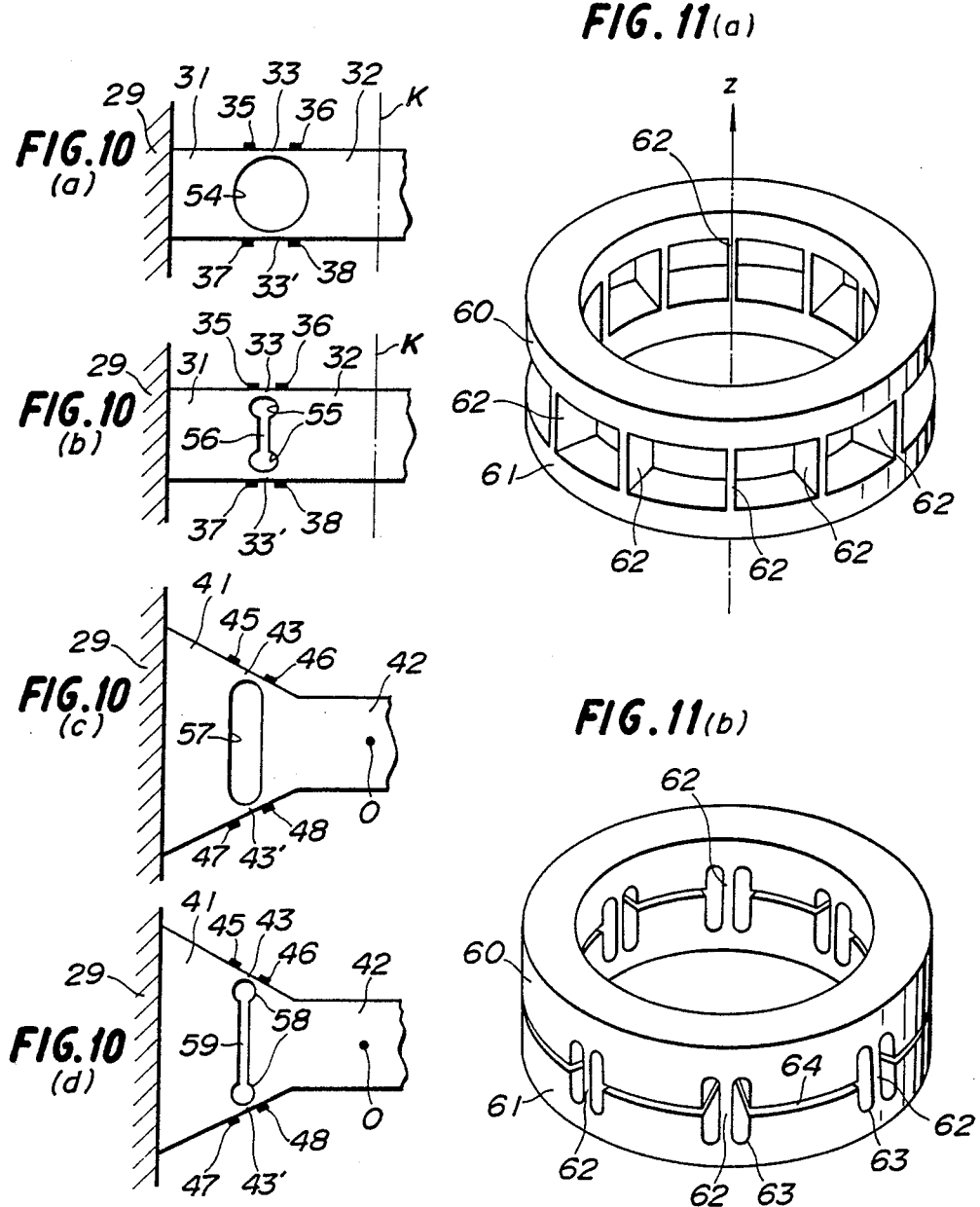

MULTI-AXIS LOAD SENSOR

This is a continuation of application Ser. No. 605,212, filed Apr. 30, 1984, U.S. Pat. No. 4,628,745.

FIELD OF THE INVENTION

This invention relates to a multi-dimensional force/moment sensor (hereinafter called "multi-axis load sensor" for the sake of brevity) adapted to detect force/moment components caused by an applied load to a body and more particularly to determine the magnitude, direction and point of action of a force, when the load is a unitary force.

DISCUSSION OF THE BACKGROUND

Multi-axis load sensors are advantageously used in a variety of application fields. With reference to some of the accompanying drawings, description will be made on a multi-axis load sensor applied by way of example for the force feedback control of an assembly robot.

FIG. 1 is a side view showing an assembly operation by the assembly robot. In the drawing, numeral 1 indicates a hand of the assembly robot while numeral 2 indicates a grip provided with the free end of the hand 1. The drawing illustrates an operation in which a pin 3 is held by the grip 2 and the pin 3 is then inserted in a hole 5 of a counterpart 4 of the fitting. In order to carry out such an operation, it is possible to chamfer the pin 3 and the edge of the hole 5 to suitable extents in advance so that, after moving the pin 3 to a substantially correct position by driving the hand 1 under control, the pin 3 may be inserted into the hole 5 owing to its own weight only by inserting the pin 3 partially into the hole 5 as illustrated in FIG. 1. It is however impossible to insert the pin 3 into the hole 5 by moving the pin 3 to an approximate position and then inserting a part of the pin 3 into the hole 5 in the same manner as mentioned above, where the dimensional difference between the inner diameter of the hole 5 and the outer diameter of the pin 3, namely, the fit clearance is of the level of 1/1000–1/10000 of the inner diameter of the hole 5. Therefore, it becomes indispensable to achieve a precise control with respect to the positioning of the pin 3. It is however impossible, in the light of the current technical level, to control the positioning operation so precisely that the pin can be successfully inserted into its corresponding hole even if the fit clearance is of the above-described minute level. With a view toward overcoming this problem, researches have been carried out on the control which makes use of a multi-axis load sensor 6 provided at a location on the hand 1 as illustrated in FIG. 1. In other words, it has been attempted to control the hand 1 in such a way that the magnitude, direction and point Q of action of a force f produced in accordance with the manner of contact between the pin 3 and hole 5 are determined on the basis of signals detected by the multi-axis force sensor 6 and the manner of action of the load f is adjusted suitably to achieve an ideal state of fitting in accordance with the information on the magnitude, direction and point of action of the force f. In general fitting works, loads applied to work items are unidirectional forces in many instances.

The control of the hand 1 which control makes use of a multi-axis load sensor 6 may be applied not only in such a pin-inserting operation but also in a teaching operation for a robot. The teaching operation for a robot has generally be carried out by an expert, who inputs data, instructions, etc. in accordance with the details of work by operating keys on a teaching panel. However, such a teaching operation requires an expert and takes many hours. In the case of a robot equipped with a hand 1 which is in turn provided with a multi-axis load sensor 6, the teaching can be carried out without operating the keys on the teaching panel provided that a worker moves the hand 1 in accordance with an actual work routine by directly holding the hand 1, the robot is controlled by signals detected by the multi-axis load sensor 6 in the course of the above-described worker's teaching operation, and the control signals are stored. It is also worth mentioning that the above teaching operation can be successfully carried out in a short period of time by an ordinary worker who does not have any special knowledge.

This multi-axis load sensor 6, which is utilized in such fields as described above, is required to have a function capable of detecting at least the magnitude, direction and line of action (which will be described later) of an applied force. Therefore, a discussion will next be made about matter required to detect these magnitude, direction and line of action of the force, based on the vectors of the force f shown in FIG. 2. Considering first the existence of coordinate axes x, y and z which are perpendicular to one another and determine, at their origin P, the magnitude, direction and point Q of action of a force f applied to the point Q of action. It is also to be assumed that the origin P and the point Q are connected to each other by a rigid member. Supposing that the components of the force f in the x-axis, y-axis and z-axis by $f_x$, $f_y$ and $f_z$ respectively, the magnitude and direction of the force f can be obtained by synthesizing its components $f_x$, $f_y$ and $f_z$. Therefore, the magnitude and direction of the force f may be determined if each of the components in the above directions can be detected. by expressing detection values of the components in the above directions as $F_x$, $F_y$ and $F_z$ respectively then $$F_x = f_x, \; F_y = f_y, \text{ and } F_z = f_z \qquad (i)$$

It is possible to determine the magnitude and direction of the force f if those $F_x$, $F_y$ and $F_z$ (hereinafter called "$F_i$" as a whole) are detected.

Next, the position of the point Q of action is to be determined. Supposing now that the distances from the origin P to the point Q of action in the directions of the x-axis, y-axis and z-axis be respectively $l_x$, $l_y$ and $l_z$ and the moment components caused by a force f along the x-axis, y-axis and z-axis be $M_x$, $M_y$ and $M_z$, the following relationship may be established among the distances $l_x$, $l_y$ and $l_z$, the moment components $M_x$, $M_y$ and $M_z$ (hereinafter called "$M_i$" as a whole) and the aforementioned force components $F_x$, $F_y$ and $F_z$:

$$M_x = -F_y \cdot l_z + F_z \cdot l_y \qquad (ii)$$

$$M_y = -F_z \cdot l_x + F_x \cdot l_z \qquad (iii)$$

$$M_z = -F_x \cdot l_y + F_y \cdot l_x \qquad (iv)$$

It is impossible to derive the position $(l_x, l_y, l_z)$ of the point Q of action only from the force components $F_i$ and moment components $M_i$. It can be known from the above equations only that the position $(l_x, l_y, l_z)$ is located on a certain specific line (which will hereinafter be called "the line of action of a force"). In order to find out the actual point Q of action, it is necessary to know the position, shape and spatial orientation of a body to which the force is being applied and to determine the crossing point between the body and the line of action of the force. This is now explained with reference to a simple example illustrated in FIG. 3, in which numeral 6 is a multi-axis load sensor and letter G indicates a rod-like rigid body fixed on the multi-axis load sensor 6. The rod-like rigid body G extends on and along the z-axis. Letter H indicates a ball having a radius r and attached fixedly to the upper extremity of the rod-like rigid body G. The distance between the center of the multi-axis sensor 6 and the center of the ball H is $z_o$. Supposing now that a load f is being applied to the ball H, the position $(l_x, l_y, l_z)$ of the point Q of action which point Q is believed to be on the spherical surface of the ball H satifises the following equation:

$$l_x^2 + l_y^2 + (l_z - z_o)^2 = r^2 \qquad (v)$$

By solving the equations (i)–(v), the position $(l_x, l_y, l_z)$ can be determined. Once the position, shape and spatial orientation of a body to which the force is being applied (the ball H in FIG. 3) are determined, the position of the point Q of action can be obtained by detecting the force components $F_i$ and moment components $M_i$ by means of the multi-axis load sensor 6. In this case, the position of the point Q of action can still be obtained even if either one of the above six equations (i)–(iv) is not available. When one relies upon the equations (i)–(iv) only, it is possible to know that the force f lies on a line L but it is impossible to specify the point Q of action. However, the position of the point Q of action may generally be determined so long as the line of action of the force can be determined, in other words, the force components $F_i$ and moment components $M_i$ can be detected, because information on the orientation, shape and spatial position of a body to which the force is being applied, for example, the hand of a robot, a body held by the hand or the like can be readily obtained.

Such a multi-axis load sensor as shown in FIG. 4 has conventionally been proposed to detect these force components $F_i$ and moment components $M_i$. The outline of the construction of the multi-axis load sensor will hereinafter be described.

FIG. 4 is a perspective view illustrating one example of conventional multi-axis load sensors. In the drawing, numeral 7 indicates a first ring connected to the first rigid body (not illustrated). On the other hand, designated at numeral 8 is a second ring which is connected to a second rigid body (not shown) and provided in face-to-face relationship with the first ring 7. Numeral 9 indicates flexible beams which connect the first ring 7 and second ring 8 to each other. Three flexible beams 9 are provided in total. Designated at numeral 10 is a tensile/compression force detection gauge applied on the inner surface of each flexible beam 9. Numeral 11 indicates a shear force detection gauge applied on the outer surface of each flexible beam 9.

In the above construction, it is now presumed that a certain load has been applied, for example, to the first rigid body. The load is transmitted via the first ring 7, each flexible beam 9 and the second ring 8 to the second rigid body. In the course of transmission of the above load, each of the flexible beams 9 is deformed in proportion to a load applied thereto. This deformation of each flexible beam 9 is detected by its respective detection gauges 10, 11. Namely, the tensile/compression force detection gauges 10 detect principally the force components $F_x, F_y$ and the moment component $M_z$ while the shear force detection gauges 11 detect mainly the force component $F_z$ and the moment components $M_x, M_y$. Detection of each of the components $F_i$ and $M_i$ is carried out by inputting a signal from each of the detection gauges 10, 11 of each flexible beam 9 to a computer and then performing a prescribed operation. The components $F_i$ and $M_i$ can thus be detected in the above manner, whereby permitting to know the magnitude, direction and line of action of the force applied to the first rigid body. Furthermore, the position of point of action of the force can also be determined if the orientation, shape and spatial position of the first rigid body are known.

However, such a conventional multi-axis load sensor is accompanied by such drawbacks that will be described below.

(1) Each flexible beam undergoes a deformation by at least two components of the force components $F_i$ and moment components $M_i$ of a load when the flexible beam is applied with the load (interaction). Accordingly, signals produced by each detection gauge contain a plurality of components. It is thus necessary to perform a complex operation by means of a computer, if one wants to obtain individual components from the plurality of components. Namely, the above interaction is not a linear interaction in many instances. The operation per se becomes extremely complex unavoidably, if one tries to enhance the accuracy of the operation so as to separate signals. Thus, the time required for the above operation is unignorably long even if a computer is relied upon. When such a multi-axis load sensor is applied to a robot for assembly work or the like, the multi-axis load sensor develops a fatal shortcoming that it is difficult to perform the real time control of the robot.

(2) In order to improve the sensitivity of the multi-axis load sensor, the rigidity of each flexible beam must be reduced. If the rigidity is lowered, the strength of the multi-axis load sensor which is interposed in the transmission path of a load from one of the rigid bodies to the other rigid body is lowered, thereby rendering the multi-axis load sensor unsuitable for actual use. In order to enhance the strength of the multi-axis load sensor on the other hand, it is necessary to make the rigidity of each flexible beam greater. However, an improvement to the rigidity of each flexible beam leads without exception to a reduction in the sensitivity of the multi-axis load sensor. This situation will be explained further, supposing that a multi-axis load sensor is provided with the hand of a robot. When the rigidity of each flexible beam is reduced, the hand of the robot is by itself lowered in strength. If the rigidity of each flexible beam is increased as opposed to the above situation, the detection accuracy is lowered, thereby making the intended control of the robot difficult.

(3) Even if the rigidity of each flexible beam is lowered and the sensitivity of the multi-axis load sensor is hence improved without paying attention to the imminent strength reduction of the multi-axis load sensor, the multi-axis load sensor develops a phenomenon that it is deformed in a direction different from the direction of a load due to the reduced rigidity of each flexible beam, in other words, the multi-axis load sensor shows poor "persistence" characteristics. A multi-axis load sensor having such characteristics affects inversely on the magnitude and/or direction of each load per se. When such a multi-axis load sensor is used to control a robot, it is impossible to perform its control with high accuracy.

There has also been proposed another type of multi-axis load sensor. It has such a structure that a first and second annular members constructed in much the same way as depicted in FIG. 4, namely, a first annular member formed of two rings connected together by a plurality of flexible beams and a second annular member formed of two rings having inner diameters greater than the outer diameter of the annular member and connected together by a plurality of flexible beams are provided, the first annular member is received in the second annular member, the first and second annular members are connected respectively to the first and second rigid members, and the first and second annular members are connected together in such a way that the transmission of each load between the first and second rigid members is effected by way of the first and second annular members. However, a multi-axis load sensor having such a structure as recited above is not essentially different from the multi-axis sensor shown in FIG. 4 and is thus accompanied by similar drawbacks.

As a further example of conventional multi-axis load sensors, reference may for example be made to a multi-axis load sensor having such a structure as disclosed in Japanese Patent Laid-open No. 39079/1976. Namely, the multi-axis load sensor has the following structure. A hub is enclosed in a housing. A spider is provided with one end (upper end) of the hub. A plurality of arms extend out from the spider. The thus-extended arms are each connected to its corresponding detector which is provided fixedly on the housing, whereby detecting each deformation of the arm. On the other hand, a radially-extending flange member is attached to the other end (i.e. the lower end) of the hub. The flange member are connected to detectors which are also fixedly provided on the housing. Accordingly, it is possible to detect displacements of a given pair of mutually-opposing points on the flange member. The housing and hub are connected via a cantilevered bar fixed to the hub. This connection between the housing and the hub is established in such a way that they are allowed to move freely in directions parallel to the longitudinal axis of the cantilevered bar but the cantilevered bar resists against any displacements of the housing and hub in directions perpendicular to the longitudinal axis of the cantilevered bar.

Such a structure is not different in nature from the multi-axis load sensor illustrated in FIG. 4. Due to inclusion of connecting and/or attachment parts between the housing and hub, the hub and spiders, and the hub and flange member, those connecting and/or attachment parts add undesirable characteristics such as non-linear characteristic and hysteresis characteristics to the detection characterstics of the multi-axis load sensor. Where these undesirable characteristics appear to considerable extents, their influence cannot be completely wiped out even if any special operation is performed, whereby reducing the accuracy of the multi-axis load sensor to a significant extent. If such a multi-axis load sensor is applied to a robot, the controllability of the robot is considerably lowered.

SUMMARY OF THE INVENTION

The present invention has been completed taking the above circumstances into consideration. An object of this invention is thus to provide a multi-axis load sensor which can solve the above-described drawbacks of conventional multi-axis load sensors, minimize the interaction of detection to an extremely low level, enjoy good detection characteristics, and permits to increase both detection sensitivity and structural strength and rigidity.

In one aspect of this invention, there is thus provided a multi-axis load sensor adapted to be connected between a first rigid member and a second rigid member so as to detect the magnitude, direction and point of action of a force to be transmitted between the first and second rigid members, which multi-axis load sensor comprises in combination:

at least one of radial plate structures having standard axes, which extend in prescribed directions, and adapted to detect moments to be produced about the standard axes by the force; and at least one of parallel plate structures, said parallel plate structures having standard axes, which extend in prescribed directions, and adapted to detect forces to be produced in the directions of their standard axes by the force, and the remaining radial plate structures; and the standard axis of the former structure being neither coincident with nor parallel to the standard axis of the latter structure.

The multi-axis load sensor according to this invention can reduce interaction among detected signals to extremely low levels and make detection characteristics linear. In addition, it also permits to enhance both detection sensitivity and structural strength and rigidity. Moreover, it also provides so-called good "persistence" characteristics.

BRIEF DESCRIPTION OF THE DRAWINGS

The above and other objects, features and advantages of the present invention will become apparent from the following description and the appended claims, taken in conjunction with the accompanying drawings, in which:

FIGS. 6(a), 6(b) and 6(c) are respectively side views of a parallel plate structure;

FIGS. 7(a), 7(b) and 7(c) are respectively side views of a radial plate structure;

FIGS. 10(a), 10(b), 10(c) and 10(d) are side views showing respectively other examples of constructions of the parallel plate structure and radial plate structure;

FIGS. 11(a) and 11(b) are respectively perspective views of still other examples of construction of the radial plate structure;

DESCRIPTION OF THE PREFERRED EMBODIMENTS

Certain embodiments of this invention will hereinafter be described with reference to FIGS. 5 through 17.

Prior to describing the first embodiment of this invention, the principle of a structure incorporated in the first embodiment will first of all be described.

Figure 5:
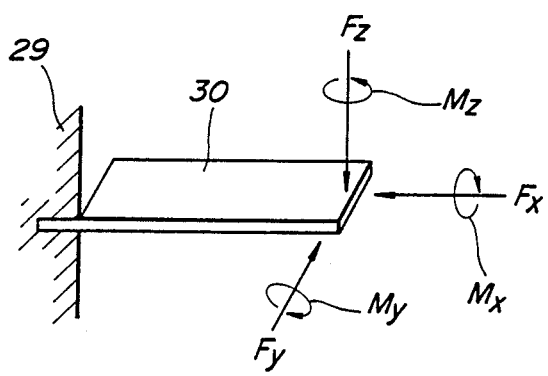
FIG. 5 is a perspective view of a plate-like flexible beam.

FIG. 5 is a perspective view of a plate-like flexible beam. In the drawing, numeral 29 indicates a support portion and numeral 30 is the plate-like flexible beam supported as a cantilevered beam on the support portion 29. Let's now assume hypothetical axes x,y,z which are perpendicular to one another. Let's also assume that, at a tip portion of the plate-like flexible beam 30, the force applied in the direction of the x-axis is $F_x$, the moment produced about the x-axis is $M_x$, the force applied in the direction of the y-axis is $F_y$, the moment produced about the y-axis is $M_y$, the force applied in the direction of the z-axis is $F_z$ and the moment produced about the z-axis is $M_z$. The plate-like flexible beam 30 is thinner in the direction of the z-axis but has far greater lengths in the directions of the x-axis and y-axis compared with the thicknesswise dimension. Accordingly, the plate-like flexible beam 30 is susceptible of undergoing deformation to the force $F_z$ and is also liable to develop deformation to the moment $M_y$ which causes the plate-like flexible beam 30 to be deformed at its tip portion in the direction of the z-axis. However, the plate-like flexible beam 30 is extremely resistant to the forces $F_x, F_y$ and the moments $M_x, M_z$. It is the parallel plate structure and radial plate structure that have been constructed on the basis of such characteristics of the plate-like flexible beam 30.

FIGS. 6(a) through 6(c) are side views of a parallel plate structure. Designated at numeral 31 is a fixing portion supported on the support portion 29 and made of a rigid material. Numeral 32 indicates a displaceable portion which is located opposite to the support portion 29 and is also made of a rigid material. Numerals 33,33' indicate thin-walled portions connecting the fixing portion 31 and displaceable portion 32 together. These thin-walled portions 33,33' are arranged parallel to each other and may be considered to be equivalent to the plate-like flexible beam 30 illustrated in FIG. 5. These thin-walled portions 33,33' can undergo deformation. A parallel plate structure 34 is thus constructed with the thin-walled portions 33,33' interposed at a central part thereof. Owing to the parallel arrangement of the thin-walled portions 33,33', the parallel plate structure 34 takes such a form as a square hole extends therethrough. A variety of forms may be contemplated for the hole defining the thin-walled portions 33,33'. This matter will however be described later in this specification. Letter K indicates a standard axis which extends through the displaceable portion 32 of the parallel plate structure 34. The standard axis K is apart by a suitable distance from the thin-walled portions 33,33' and may be considered as assuming a position near the point of action of the below-described force $F_z$. Numerals 35,36,37,38 are respectively strain gauges provided at root portions of the thin-walled portions 33,33'.

In the parallel plate structure 34 having such a structure as described above, let's now assume that the force $F_z$ has been applied in the direction of the z-axis to the displaceable portion 32. The parallel plate structure 34 then develops a deformation because the thin-walled portions 33,33' are bent into substantially the same shape as illustrated in FIG. 6(b). This deformation occurs readily as the lengths of the thin-walled portions 33,33' remain constant. On the other hand, the parallel plate structure 34 is resistant to the forces $F_x, F_y$ applied respectively in the directions of the x-axis and y-axis and to the moment $M_x, M_z$ produced respectively about x-axis and z-axis, similar to the plate-like flexible beam shown in FIG. 5. It may practically be considered that the plate-like flexible beam 30 illustrated in FIG. 5 is absolutely rigid against the forces $F_x, F_y$ and the moment $M_z$. The plate-like flexible beam 30 is more susceptible of undergoing deformation by the moment $M_x$, compared with the above-mentioned three components. Owing to the modification into the parallel plate structure, the rigidity has also been enhanced against the moment $M_x$. Let's now discuss about the deformation of the parallel plate structure 34 when the moment $M_y$ has been produced about the y-axis at the displaceable portion 32. FIG. 6(c) shows the deformation caused by the moment $M_y$. As apparent from the drawing, this deformation has elongated the thin-walled portion 33 but compressed the thin-walled portion 33'. Thus, this deformation is a deformation under which the thin-walled portion 33 is made different in length from the thin-walled portion 33', and develops internal forces in the thin-walled portions 33,33' along the x-axis. Therefore, the moment $M_y$ which is required to develop such a deformation must be very large. In other words, the parallel plate structure 34 has a high degree of rigidity to the moment and hardly undergoes deformation under that moment.

It is thus understood from the above explanation that the parallel plate structure 34 shown in FIGS. 6(a)–6(c) undergoes deformation by the force $F_z$ only and exhibits a high degree of rigidity to every other forces and moments. In other words, the displaceable portion 32 of the parallel plate structure 34 undergoes a displacement only by forces applied in the direction of the z-axis but does not show a displacement in any other directions. Furthermore, the displaceable portion 32 of the parallel plate structure 34 does not develop any rotary displacement.

Here, the detection of strains of the thin-walled portions 33,33' by means of the strain gauges 35,36,37,38 is to be described. When the force $F_z$ has been applied as illustrated in FIG. 6(b), tensile strains are produced in the strain gauges 35,38 while compression strains are developed in the strain gauges 36,37. When the moment $M_y$ has been exerted simultaneously with the force $F_z$, such a deformation as shown in FIG. 6(c) is also produced although the extent of the deformation is extremely small. Then, the outputs of the strain gauges 35,38 are added. On the other hand, the outputs of the strain gauges 36,37 are also added together. If a bridge circuit is formed in such a way that the signs of the resultant values are opposite to each other, the small output portions of the deformation mode produced by the moment $M_y$ are cancelled out, thereby allowing to obtain a correct signal proportional to the force $F_z$ from the bridge circuit. By the way, it is possible to use as such detection means various detection means such as differential transformers capable of detecting displacements of the parallel plate structure, electrocapacitive detection means, eddy-current detection means, and the like, besides the above-mentioned strain gauges which detect strains.

It is now clear from the above description that the parallel plate structure 34 shown in FIGS. 6(a)–6(c) undergoes deformations only by the force $F_z$ applied in the direction of the z-axis. Needless to say, it is however possible to detect the forces $F_x,F_y$ with such parallel plate structures if the parallel plate structures are applied in different directions so that their standard axes K are respectively directed along the x-axis and the y-axis. However, such a parallel plate structure 34 is unable to detect moments about each of the axes, as mentioned above. It is thus indispensable to use additional means which are capable of detecting moments about the axes. The above means must however detect only moments about the axes in order to achieve the object of this invention. As a result of various investigation, the present inventor has finally found out detection means capable of satisfying the above requirement. A radial plate structure, which is the above-found detection means, will hereinafter be described with reference to FIGS. 7(a) through 7(c).

FIGS. 7(a) through 7(c) are side views of the radial plate structure. In the drawings, numeral 29 indicates a support portion, numeral 41 is a fixing portion supported by the support portion 29 and made of a rigid material, and numeral 42 indicates a displaceable portion located opposite to the support portion 29 and made of a rigid material. Numerals 43,43' indicate respectively thin-walled portions which connect the fixing portion 41 and displaceable portion 42 together. These thin-walled portions 43,43' correspond to the plate-like flexible beam 30 shown in FIG. 5 and have deformable function. The thin-walled portions 43,43' extend radially from the displaceable portion 42 toward the fixing portion 41, with a point O as the center of the radial extension. The opening angle defined by the thin-walled portion 43 and the thin-walled portion 43' is indicated by $\theta$. A radial plate structure 44 is constructed with such thin-walled portions 43,43' placed at a central part thereof. Since the thin-walled portions 43,43' extend radially, the radial plate structure 44 has such a shape as being formed by boring a trapezoidal hole through a rigid body, when seen in side view as illustrated in FIG. 7(a). A variety of shapes may be contemplated for the hole which defines the thin-walled portions 43,43'. However, this matter will be described later in this specification. An axis, which extends through the point O and is perpendicular to the sheet of the drawing, is employed as a standard axis of a radial plate structure 44. Numerals 45,46,47,48 indicate respectively strain gauges provided to root portions of the thin-walled portions 43,43'.

When the moment $M_y$ is applied about the standard axis passing through the point O on the displaceable portion 42 in the above radial plate structure 44 the y-axis is supposed to extend along the standard axis, the radial plate structure 44 is bent at the thin-walled portions 43,43' and undergoes a deformation as shown in FIG. 7(b). This deformation occurs readily because the lengths of the thin-walled portions 43,43' remain constant. On the other hand, the radial plate structure 44 has a high degree of rigidity against the forces $F_x,F_y$ applied in the directions of the x-axis and y-axis and the moments $M_x,M_z$ produced about the x-axis and z-axis, similar to the plate-like flexible beam shown in FIG. 5. Therefore, it is difficult to cause the radial plate structure 44 to undergo a deformation by such forces and moments. Next, a discussion will be made on the deformation of the radial plate structure 44 when the force $F_z$ is applied in the direction of the z-axis to the displaceable portion 42. FIG. 7(c) is referred to. As apparent from the drawing, the deformation by the force $F_z$ takes place in such a way that the thin-walled portion 43 is elongated but the thin-walled portion 43' is compressed. Therefore, the above deformation makes the lengths of the thin-walled portions 43,43' different from each other and involves axial forces in the planes of the thin-walled portions 43,43'. Thus, the force $F_z$ which is required to develop the deformation is very large. Namely, the radial plate structure 44 has a high degree of rigidity against the force $F_z$ and hardly undergoes deformation by the force $F_z$.

From the above description, it is understood that the radial plate structure 44 shown in FIG. 7 undergoes deformation only when the moment $M_y$ is applied. It has a high degree of rigidity against all other forces and moments. In other words, the displaceable portion 42 of the radial plate structure 44 is displaced only when the moment $M_y$ is applied. It is displaced only very little when other forces or moments are applied.

In addition, the opening angle $\theta$ of the thin-walled portions 43,43' may take any desired value. However, when the angle $\theta$ is set at an excessively small value ($0 < \theta < < 90°$), the rigidity against the force $F_z$ applied in the direction of the z-axis is lowered somewhat. On the other hand, if the angle $\theta$ is set at a too large value ($90° < < \theta < 180°$), the rigidity against the force $F_x$ applied in the direction of the x-axis would be reduced to an unacceptable low level. Taking the foregoing into consideration, it is desirous to have a value of the angle $\theta$ of about 90°. By setting the angle $\theta$ at such a value, it is possible to obtain a radial plate structure having high rigidity against both of the forces $F_x,F_z$.

The strain detection means led by the strain gauges 45,46,47,48 are the same as the detection means in the parallel plate structure. Their description is thus omitted (strain detection means will not be described in the subsequent embodiments of this invention).

The structural principles of the parallel and radial plate structures have now been completed. Next, description will be made on a first embodiment in which the above structural principles have been incorporated.

Figure 8:
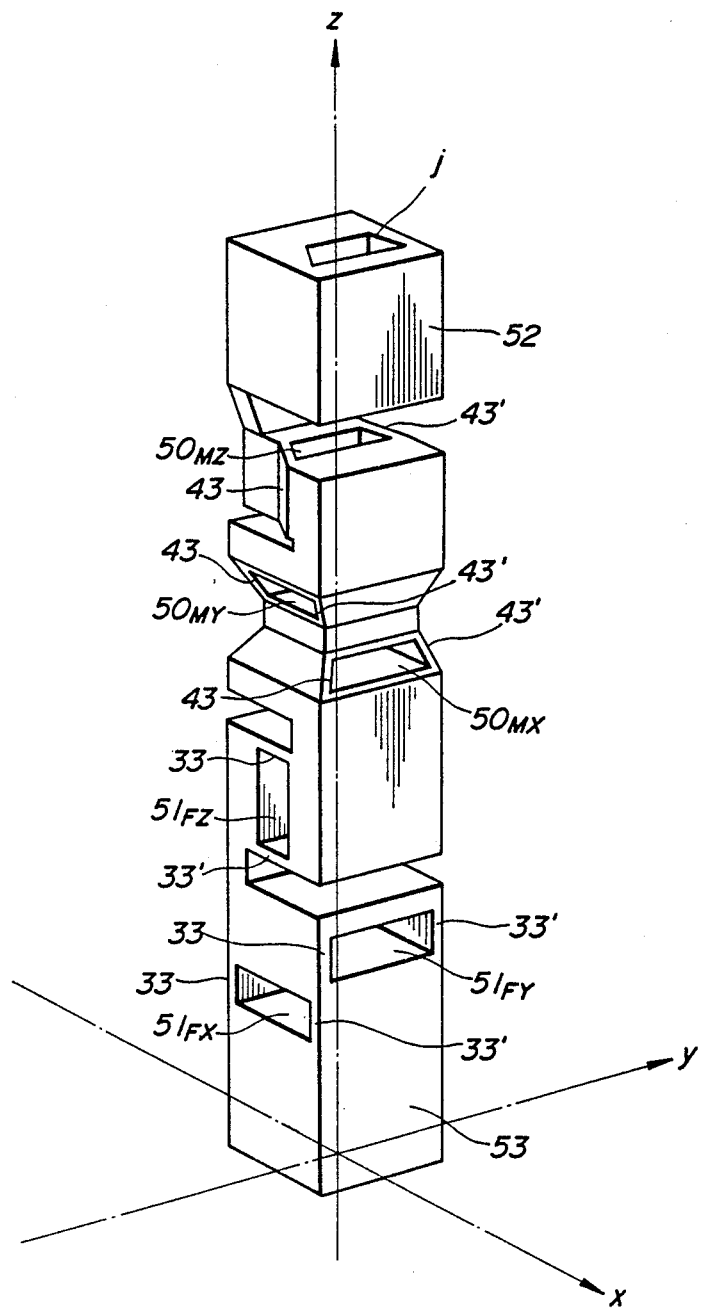
FIG. 8 is a perspective view of a 6-axis load sensor according to the first embodiment of this invention.

FIG. 8 is a perspective view of a 6-axis load sensor according to the first embodiment of this invention. In the drawing, numerals 52,53 are a first and second rigid bodies respectively. Between the first rigid body 52 and the second rigid body 53, parallel plate structures and radial plate structures, which are respectively the same as those shown in FIGS. 6 and 7, are connected in series along the z-axis indicated by a dashed line in the drawing, with their x-axes and y-axes coincident in direction respectively with the x-axis and y-axis indicated by dashed lines in the drawing. The thin-walled portions of each parallel plate structure and the thin-walled portions of each radial plate structure are respectively indicated by the same numerals 33,33',43,43' as used respectively in FIGS. 6 and 7. Strain detection means such as strain gauges are omitted in the drawing.

Numeral $50_{MZ}$ indicates a radial plate structure which undergoes a deformation by the moment $M_z$ about the z-axis. The radial plate structure $50_{MZ}$ is connected to the first rigid body 52. The letters "MZ" attached to the numeral 50 indicates the moment $M_z$ (this also applies to each of the subsequent moments and forces). Numeral $50_{MY}$ indicates a radial plate structure which undergoes a deformation by the moment $M_y$ about the y-axis. Numeral $50_{MX}$ is a radial plate structure which undergoes a deformation by the moment $M_x$ about the x-axis. The radial plate structure $50_{MX}$ is connected to the radial plate structure $50_{MY}$. Numeral $51_{FZ}$ indicates a parallel plate structure which undergoes a deformation by the force $F_z$ applied in the direction of the z-axis. The parallel plate structure $51_{FZ}$ is connected to the radial plate structure $50_{MX}$. Numeral $51_{FY}$ designates a parallel plate structure which undergoes a deformation by the force $F_y$ applied in the direction of the y-axis. The parallel plate structure $51_{FY}$ is coupled with the parallel plate structure $51_{FZ}$. Designated at numeral $51_{FX}$ is a parallel plate structure which undergoes a deformation by the force $F_x$ applied in the direction of the x-axis. The parallel plate structure $51_{FX}$ is connected to both of the parallel plate structure $51_{FY}$ and second rigid body 53. These first and second rigid bodies 52,53, radial plate structures $50_{MZ}$, $50_{MY}$, $50_{MX}$ and parallel plate structures $51_{FZ}$,$51_{FY}$,$51_{FX}$ are constructed into a unitary block. Furthermore, letter j indicates a machining bore which was used to drill a through-hole for forming the radial plate structure $50_{MZ}$. The standard axes of the radial plate structures $50_{MZ}$,$50_{MY}$,$50_{MX}$ extend at right angles with one another. Similarly, the standard axes of the parallel plate structures $51_{FZ}$,$51_{FY}$,$51_{FX}$ are arranged in such a way that they extend perpendicularly to one another.

Let's now assume that a certain load (which is generally composed of force components $F_x,F_y,F_z$ and moment components $M_x,M_y,M_z$) has been exerted to the first rigid body 52. Then, the load is successively transmitted via the radial plate structures $50_{MZ}$,$50_{MY}$,$50_{MX}$ and parallel plate structures $51_{FZ}$,$51_{FY}$,$51_{FX}$, and eventually to the second rigid body 53. Here, attention is now paid only to the force component $F_z$ applied in the direction of the z-axis out of the above load. The force $F_z$ is first of all transmitted from the first rigid body 52 to the radial plate structure $50_{MZ}$. Since the radial plate structure $50_{MZ}$ exhibits a high degree of rigidity against the force $F_z$ as mentioned above, the radial plate structure $50_{MZ}$ transmits the force $F_z$ as is to the next radial plate structure $50_{MY}$ without developing any deformation at its thin-walled portions 43,43'. Similarly, the radial plate structure $50_{MY}$ transmits the force $F_z$ to the next radial plate structure $50_{MX}$ without being deformed by the force $F_z$. In the same manner, the radial plate structure $50_{MX}$ transmits the force $F_z$ to the next parallel plate structure $51_{FZ}$ without undergoing any deformation. Reaching here, the force $F_z$ causes the thin-walled portions 33,33' of the parallel plate structure $51_{FZ}$ to undergo deformation in accordance with the magnitude of the force $F_z$. This deformation is detected by unillustrated strain detection means such as strain gauges or the like. Thereafter, the force $F_z$ is transmitted to the next parallel plate structure $51_{FY}$ while deforming the parallel plate structure $51_{FZ}$. As mentioned above, the parallel plate structure $51_{FY}$ is deformed only by the force $F_y$ applied in the direction of the y-axis. Accordingly, the force $F_z$ is transmitted to the next parallel plate structure $51_{FX}$ without causing the parallel plate structure $51_{FY}$ to undergo any deformation. The force $F_z$ is similarly transmitted from the parallel plate structure $51_{FX}$ to the second rigid body 53 without deforming the parallel plate structure $51_{FX}$. Thus, the force component $F_z$ in the direction of the z-axis, out of the load applied to the first rigid body 52, is transmitted to the second rigid body 53 while deforming the parallel plate structure $51_{FZ}$ only. Other force components and moment components are also transmitted while causing only their corresponding parallel plate structures and radial plate structures to undergo deformation. The transmission of each force or moment component takes place in the same manner when a load is transmitted in the opposite direction, namely, from the second rigid body 53 to the first rigid body 51.

In the first embodiment, three parallel plate structures are arranged in such a manner that their standard axes extend perpendicularly to one another and three radial plate structures are also arranged in such a way that their standard axes are normal to one another. The force components of an applied load in the directions of the axes and the moment components of the applied load about the axes are therefore detected respectively by different parallel plate structures and radial plate structures (in other words, by their corresponding specific parallel plate structures and radial plate structures). It is thus possible to lower the interaction among detected signals to an extremely small level. It thus permits to know the magnitude, direction and line of action of the force and, if the position, shape and attitude of a body to which the force was applied are known, to carry out the operation on the position of point of action of the force readily and precisely. Furthermore, the 6-axis load sensor is formed into a unitary structure which is formed in its entirety from a rigid body. It is thus possible to enjoy good detection sensitivity and great strength. In addition, the 6-axis load sensor can provide so-called good "persistence" characteristics. The 6-axis load sensor can also avoid occurrence of undesirable characteristics such as non-linear characteristics and hysteresis characteristics because it does not contain any attachment or connecting portions. As already mentioned in the description of the equations (i)–(iv), the initial object of "determining the line of action" can generally be achieved even by a 5-axis load sensor which is formed by omitting either one of the radial plate structures and parallel plate structures in the first embodiment. However, information on the force in the direction of a specific axis becomes indispensable depending on the direction of the line of action. When determining the line of action of a force applied approximately parallel to the x-axis for example, it is obvious that a 6-axis load sensor having no detection means for $F_x$ can make only detection of very poor accuracy. However, the provision of all the radial plate structures and parallel plate structures in the first embodiment of this invention makes it possible to utilize information on a moment or force obtained by the unomitted radial or parallel plate structure. This additional information can avoid occurrence of operational errors and assures to obtain correct values.

Figure 9A:
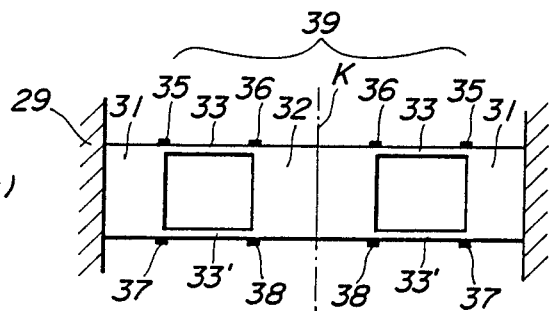
FIGS. 9(a), 9(b), 9(c) and 9(d) are side views of a parallel plate structure and radial plate structure which are different in construction from those respectively illustrated in FIGS. 6 and 7.
Figure 9B:
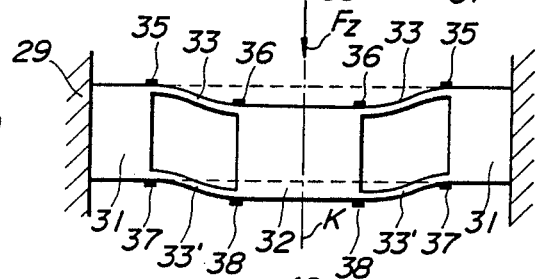

The second embodiment of this invention will next be described. Prior to starting the description, parallel plate structures and radial plate structures, which are used in the second embodiment, will be explained. FIGS. 9(a) through 9(d) are respectively side views of a parallel plate structure and radial plate structure employed in the second embodiment. In the drawings, the same parts or elements as those illustrated in FIGS. 6 and 7 are indicated by like reference numerals and their explanation is thus omitted. In FIG. 9(a), a parallel plate structure 39 is shown. As will immediately be understood from the drawing, this parallel plate structure 39 has been formed by connecting two of the parallel plate structure shown in FIG. 6(a) side by side with only one displaceable portion 32 commonly shared by both of the constituent parallel plate structures. In the above construction, loads are applied to the displaceable portion 32 and the standard axis K passes through substantially a central part of the displaceable portion 32. Supposing now that a force $F_z$ is applied to the displaceable portion 32 as shown in FIG. 9(b), the thin-walled portions 33,33' provided at both sides relative to the standard axis in the parallel plate structure 39 develop the same deformation. This deformation occurs extremely readily because the lengths of both thin-walled portions 33,33' cannot be changed. However, the parallel plate structure 39 shows a high degree of rigidity against the force components $F_x, F_y$ applied respectively in the directions of the x-axis and y-axis to the displaceable portion 32 and the moment components $M_x, M_y, M_z$ applied respectively about the x-axis, y-axis and z-axis to the displaceable portion 32, for the same reasons as explained in the description of the parallel plate structure 34 shown in FIG. 6. Therefore, the parallel plate structure 39 can hardly be deformed by such force or moment components. Consequently, the parallel plate structure 39 has such characteristics that it undergoes deformation only by the force component $F_z$ but has high rigidity against every other force component and moment component and is hence hardly deformable by such other force components or moment components.

Figure 9C:
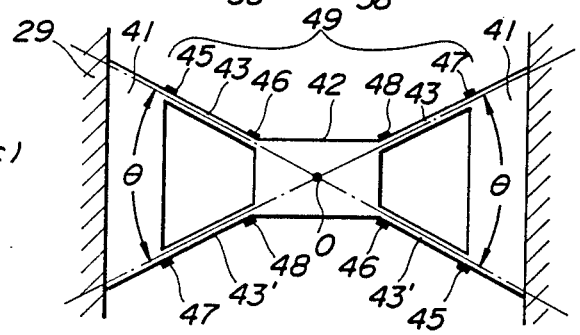
Figure 9D:
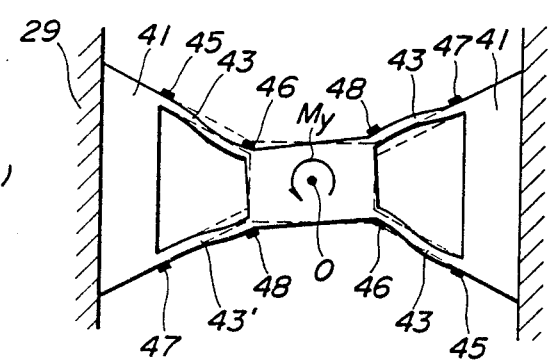

In FIG. 9(c), there is illustrated a radial plate structure 49. As apparent from the drawing, the radial plate structure 49 has such a structure, similar to the parallel plate structure 39, that two of the radial plate structure 44 depicted in FIG. 7(a) are connected side by side at the displaceable portion 42. In the above construction, the opening angle $\theta$ of the thin-walled portions 43,43' at one side is equal to the opening angle $\theta$ of the thin-walled portions 43,43' at the other side. A point O is located at the center of the displaceable portion 42. A line, which passes through the point O and is perpendicular to the drawing sheet, is the standard axis of the radial plate structure 49. Let's now assume that a moment $M_y$ has been applied to the displaceable portion 42 as indicated by an arrow in FIG. 9(d). The two sets of the thin-walled portions 43,43', which are provided respectively at both sides of the radial plate structure 49, undergo deformations symmetrically with respect to the point O. These deformations occur extremely easily because the lengths of both thin-walled portions 43,43' are unchangeable. The radial plate structure 49 however exhibits a high degree of rigidity against the force components $F_x, F_y, F_z$ applied respectively in the directions of the x-axis, y-axis and z-axis to the displaceable portion 42 and the moment components $M_x, M_z$ applied about the x-axis and y-axis to the displaceable portion 42, for the same reasons as mentioned in the description of the radial plate structure 44 depicted in FIG. 7. Accordingly, the radial plate structure is hardly deformed by these force components and moment components. Consequently, the radial plate structure 49 has such characteristics that it undergoes deformation only by the moment component $M_y$ but has high rigidity against every other force components and moment components and can hardly be deformed by such force and moment components.

The parallel plate structure 39 and radial plate structure 49 illustrated respectively in FIGS. 9(a) and 9(c) permit their thin-walled portions 33,33', 43,43' to undergo more correct deformation compared with the single cantilevered parallel plate structure 34 and radial plate structure 44 illustrated respectively in FIG. 6(a) and FIG. 7(a), since the displaceable portions 32,42, to which loads are applied, make up central portions of structures supported at both ends thereof.

FIGS. 10(a) through 10(d) are side views of further structural examples of the parallel plate structure and radial plate structure respectively. The parallel plate structure 39 shown in FIG. 9(a) has a shape defining square holes, whereas the radial plate structure 49 depicted in FIG. 9(c) has a shape forming trapezoidal holes. Namely, it may be considered that the thin-walled portions 33,33' of the parallel plate structure 39 are formed by the square holes and the thin-walled portions 43,43' of the radial plate structure 49 are formed by the trapezoidal holes. Needless to say, the formation of the thin-walled portions 33,33', 43,43' is not limited to the formation of square holes and trapezoidal holes only. They may be formed by holes of other shapes.

In FIG. 10(a), numeral 54 indicates a circular hole formed through a rigid body. The thin-walled portions 33,33' of the parallel plate structure are formed by the circular hole 54. Here, it should be borne in mind that the right half portion of the parallel plate structure is omitted in the drawing (this also applies to FIGS. 10(b) through 10(d)). In FIG. 10(b), numeral 55 indicates small circular holes formed respectively in an upper and lower edge portions. The circular holes 55 are precisely opposed to each other. Numeral 56 is a linear slot communicating these two small circular holes 55. By forming the circular holes 55 and linear slot 56, the thin-walled portions 33,33' of the parallel plate structure are defined. In FIG. 10(c), numeral 57 indicates a substantially elliptical hole formed through a rigid body and extending substantially to the upper and lower edges. The thin-walled portions 43,43' of the radial plate structure are formed by the above elliptical hole 57. In FIG. 10(d), numeral 58 indicates small circular holes formed in a precisely-opposing relation in an upper and lower edge portions of a rigid body. On the other hand, numeral 59 indicates a linear slot communicating these two circular holes. By forming the circular holes 58 and linear slot 59, the thin-walled portions 43,43' of the radial plate structure are formed. Various holes and slots which form the thin-walled portions 33,33',43,43' of the parallel plate structure and radial plate structure have been described above. These holes and slots can obviously be applied to the parallel plate structure and radial plate structure illustrated respectively in FIGS. 6 and 7. Namely, it is only necessary, irrespective to the shape of each hole, that thin-walled portions having the function of a flexible beam be formed into prescribed shapes and be arranged in a predetermined fashion.

FIGS. 11(a) and 11(b) are perspective views of further modifications of the radial plate structure. In FIG. 11(a), numeral 60 indicates a ring-shaped first rigid body and numeral 61 indicates a ring-shaped second rigid body having substantially the same dimensions as the first rigid body 60. Numeral 62 indicates a number of thin-walled portions connecting the first rigid body 60 and the second rigid body 61 together. The thin-walled portions 62 are arranged radially and with the same interval on the peripheries of the first rigid body 60 and second rigid body 61. The opening angle between adjacent two thin-walled portions 62 is the same. When the second rigid body 61 is fixed and a moment $M_z$ is applied to the first rigid body 60 about the z-axis which passes the center of each of the rigid bodies 60,61. The thin-walled portions 62 are then deformed respectively in the directions of their respective peripheral tangents. The way of this deformation is close to the deformation pattern shown in FIG. 6(b) so long as the width of each thin-walled portion 62 is kept small compared with the distance to the central point of the radial angle. In other words, the first rigid body 60 or the second rigid body 61 is susceptible of undergoing a deformation by a moment about the z-axis but shows a high degree of rigidity against every other moment components and force components. As apparent from the above description, the structure shown in FIG. 11(a) is a radial plate structure having characteristics similar to those illustrated in FIGS. 7 and 9(c). In order to form the thin-walled portions 62, it is possible to use elliptical holes 57 or small circular holes 58 and linear slots 59 illustrated respectively in FIGS. 10(c) and 10(d) similar to the radial plate structures depicted respectively in FIGS. 7 and 9(c).

FIG. 11(b) illustrates a radial plate structure having thin-walled portions which are defined by elliptical holes and sector holes. In the drawing, numeral 63 indicates elliptical holes. The thin-walled portions are formed by a plural set of two mutually-opposing elliptical holes 63. The elliptical hole 63 in each set is connected to the elliptical hole 63 of the adjacent set via a sector hole 64. Owing to the provision of the sector holes 64, the first rigid body 60 and the second rigid body 61 are connected by the plurality of thin-walled portions 62 only, thereby forming substantially the same radial plate structure as that shown in FIG. 11(a). In the radial plate structures shown in FIGS. 11(a) and 11(b), the thin-walled portions are arranged with the same opening angle and interval. It is however not always necessary to arrange the thin-walled portion with the same interval. They may be arranged with different intervals without encountering any problem or inconvenience.

The second embodiment of this invention, which makes use of the above-described parallel plate structures and radial plate structures, will next be described.

Figure 12:
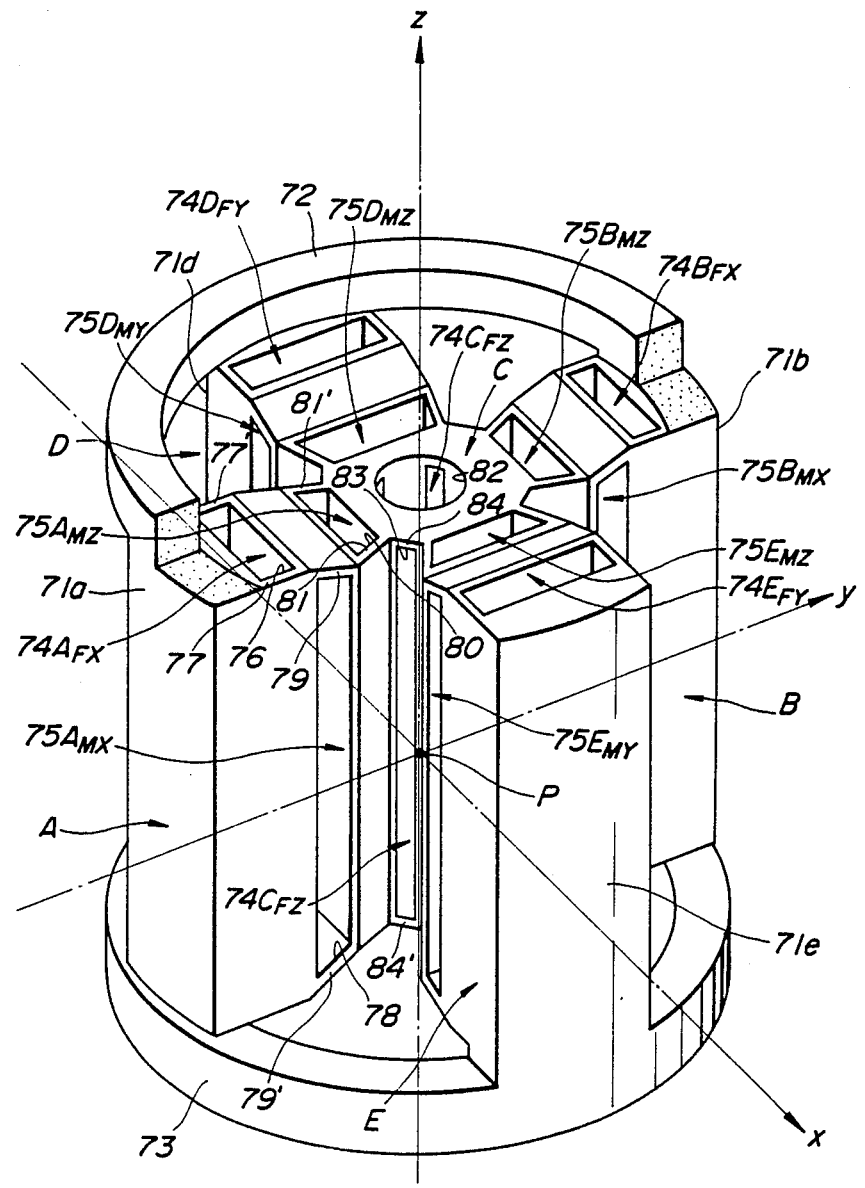
FIG. 12 is a perspective view of a 6-axis load sensor according to the second embodiment of this invention, a part of which has been cut away.
Figure 13:
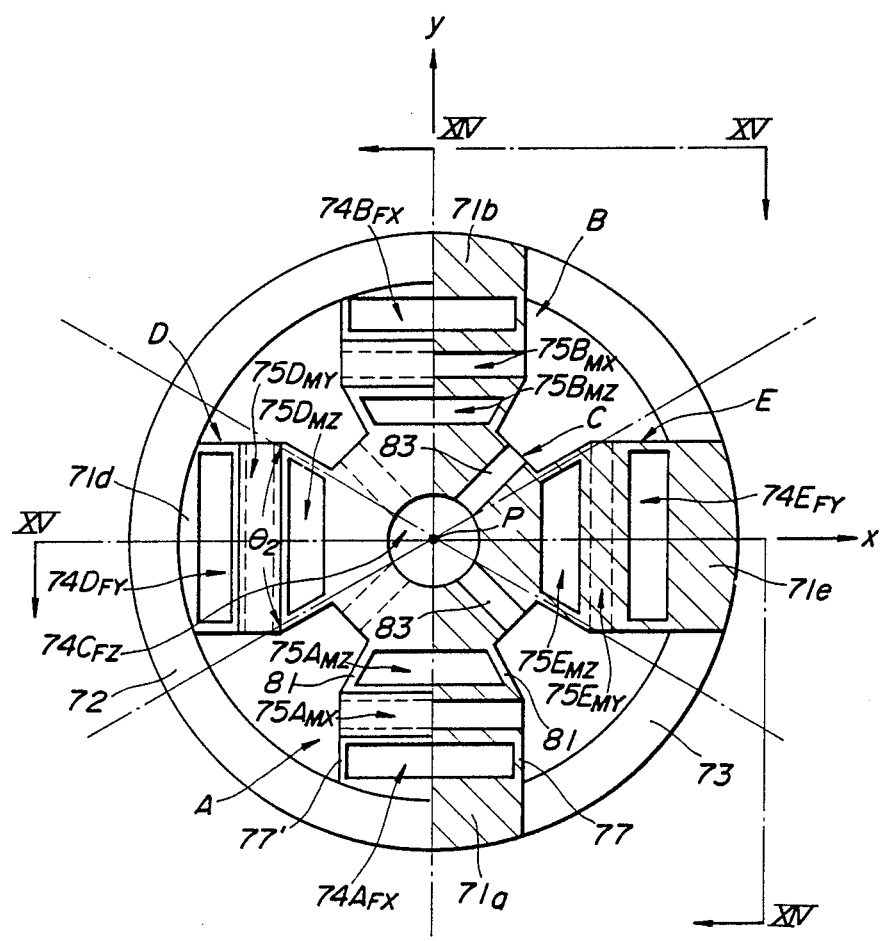
FIG. 13 is a plan view of the 6-axis load sensor shown in FIG. 12, a part of which is shown in cross-section.
Figure 14:
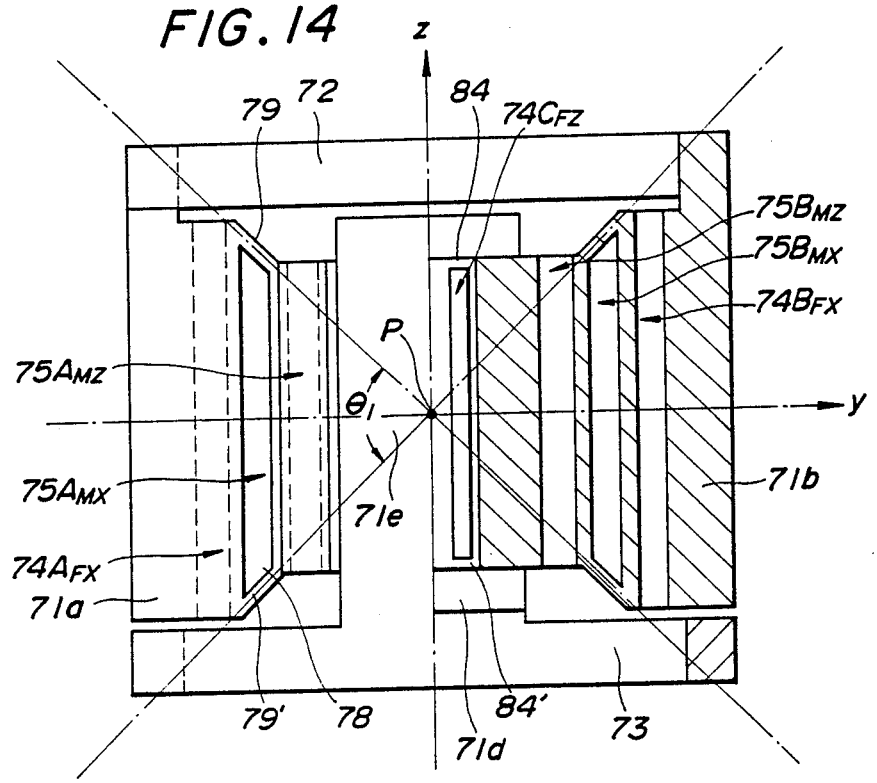
FIG. 14 is a side view of the 6-axis load sensor of FIG. 12, a part of which is illustrated in cross-section along line XIV—XIV of FIG. 13.
Figure 15:
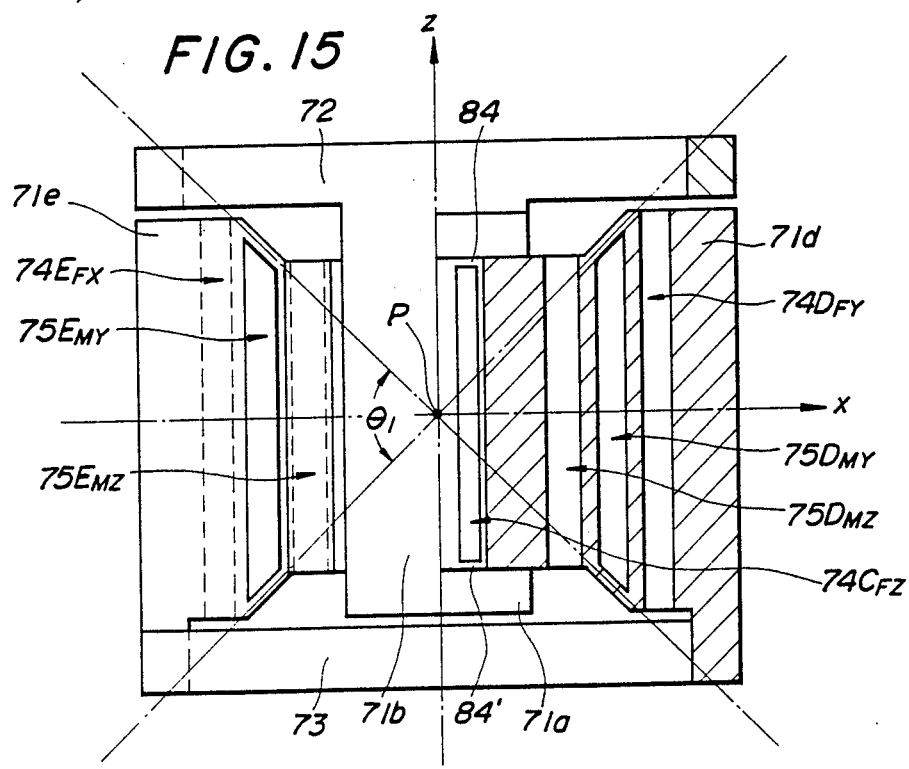
FIG. 15 is a side view of the 6-axis load sensor shown in FIG. 12, a part of which is shown in cross-section along line XV—XV of FIG. 13.

FIG. 12 is a perspective view of a 6-axis load sensor according to the third embodiment of this invention. FIG. 13 is a plan view of the 6-axis load sensor of FIG. 12, a part of which 6-axis load sensor is shown in cross-section. FIG. 14 is a side view of the 6-axis load sensor, a part of which is shown in cross-section along line XIV—XIV of FIG. 13. FIG. 15 is a side view of the 6-axis load sensor, a part of which is shown in cross-section along line XV—XV of FIG. 13. The 6-axis load sensor according to the second embodiment of this invention will hereinafter be described, referring principally to FIG. 12. The 6-axis load sensor is constructed substantially of five load-responsive portions A, B, C, D and E. Namely, letter C indicates a central load-responsive portion assuming a central position in the 6-axis load sensor. Letter A indicates a first load-responsive portion extending out in a direction from the central load-responsive portion C. Designated at letter B is a second load-responsive portion which extends out from the central load-responsive portion in a direction opposite to the first load-responsive portion A. Letter D means a third load-responsive portion which extends out from the central load-responsive portion C in a direction perpendicular to both first and second load-responsive portions A,B. Letter E indicates a fourth load-responsive portion which extends out from the central load-responsive portion C in a direction opposite to the third load-responsive portion D. Owing to the provision of these load-responsive portions A, B, C, D and E, the overall structure of the main part of the 6-axis load sensor takes a cross-like structure. Numerals 71a, 71b, 71d and 71e indicate respectively outer wall portions of the load-responsive portions A, B, D and E.

Numeral 71 indicates a ring-shaped upper member, one half portion of which is omitted in FIG. 12. The ring-shaped upper member 72 is connected to the outer wall portions 71a, 71b of the first and second load-responsive portions A,B. (The ring-shaped upper member 71 is not connected to the outer wall portions 71d, 71e.) The ring-shaped upper member 72 is connected to a rigid body which is not illustrated in the drawing. Numeral 73 indicates a ring-shaped lower member, which is connected to the outer wall portions 71d, 71e of the third and fourth load-responsive portions D,E. (The ring-shaped lower member 73 is not connected to the outer wall portions 71a, 71b.) The ring-shaped lower member 73 is connected to another rigid body which is not illustrated in the drawing. The above-described load-responsive portions A,B,C,D,E, the ring-shaped upper member 72 and the ring-shaped lower member 73 are formed into an integral structure.

Let's now assume that the central point of the above 6-axis load (said central point being present in the central load-responsive portion C) be P, a coordinate axis extending out from the central point P toward both first and second load-responsive portions A,B be a y-axis, a coordinate axis extending out from the central point P toward both the third and fourth load-responsive portions D,E be an x-axis, and a coordinate axis extending perpendicularly to the y-axis and x-axis and passing through the central load-responsive portion C be a z-axis. The structure of the first load-responsive portion A will be explained first of all.

The first load-responsive portion A is constructed, in order from the outer wall portion 71a toward the central load-responsive portion C, a parallel plate structure 74A$_{FX}$, a radial plate structure 75A$_{MX}$ and a radial plate structure 75A$_{MZ}$. The parallel plate structure 74A$_{FX}$ includes thin-walled portions 77,77' formed by a rectangular hole 76 extending along the z-axis. These thin-walled portions 77,77' are equivalent to the thin-walled portions 33,33' illustrated in FIG. 9(a). As readily envisaged from the description on the above parallel plate structures, the thin-walled portions 77,77' undergo deformations in accordance with the magnitude and direction of the force component $F_x$ when the force component $F_x$ is applied in the direction of the x-axis to the parallel plate structure 74A$_{FX}$. The resulting strains are detected as signals by means of detection means such as strain gauges (which are not shown in the drawing. Detection means will be omitted in subsequent embodiments) provided at root portions of the thin-walled portions 77,77'. The parallel plate structure 74A$_{FX}$ does not undergo any deformation by force components in the directions of the y-axis and z-axis and moment components about the x-axis, y-axis and z-axis, and shows high rigidity against such force and moment components. Namely, the parallel plate structure 74A$_{FX}$ is deformed by a force component applied in the direction of the x-axis only, thereby detecting the force component.

The radial plate structure $75A_{MX}$ has radially-disposed thin-walled portions 79,79' which are defined by a trapezoidal hole 78 extending in the direction of the x-axis. The thin-walled portions 79,79' are formed, as illustrated in FIG. 14, in such a way that they form an angle $\theta_1$ with respect to the point P. These thin-walled portions 79,79' correspond to the thin-walled portions 43,43' illustrated in FIG. 9(c). As readily understood from the description on the above radial plate structures, when the moment $M_x$ is applied about the x-axis to the radial plate structure $75A_{MX}$, the thin-walled portions 79,79' undergo deformations in response to the moment $M_x$, thereby detecting the moment $M_x$. The radial plate structure $75A_{MX}$ is capable of undergoing deformation only by the moment $M_x$ but exhibits high rigidity against the other moment components and force components. The radial plate structure $75A_{MZ}$ has radially-disposed thin-walled portions 81,81' formed by a trapezoidal hole 80 which extends in the direction of the z-axis. The thin-walled portions 81,81' are formed, as shown in FIG. 13, in such a way that they form an angle $\theta_2$ with respect to the point P. They are equivalent to the thin-walled portions 43,43' depicted in FIG. 9(c). When the moment $M_z$ is applied about the z-axis to the radial plate structure $75A_{MZ}$, the thin-walled portions 81,81' undergo deformations in response to the moment $M_z$, thereby detecting the moment $M_z$. The radial plate structure $75A_{MZ}$ develops deformation only by the moment $M_z$ but exhibits high rigidity against the other moment components and force components.

Here, numerals $74A_{FX},75A_{MX},75A_{MZ}$, which also appear in the drawings, will be explained. Numeral 74 indicates that each structure designated by this numeral is a parallel plate structure. On the other hand, numeral 75 indicates that each structure designated by this numeral is a radial plate structure. Letter A indicates that a structure bearing this letter is located in the first load-responsive portion A. In addition, letters FX attached to a structure indicates that the structure can selectively detect the force $F_x$ applied in the direction of the x-axis. Letters MX means that a structure bearing these letters can selectively detect the moment $M_x$ about the x-axis. Letters MZ means it is the moment $M_z$ about the z-axis that a structure bearing these letters can selectively detect. Each of structures in each load-responsive portion in the following embodiments of this invention is attached with a numeral and letters in accordance with the above-mentioned standard.

Next, the structure of the central load-responsive portion C will be described. A through-bore 82 is formed in the direction of the z-axis through a central part of the central load-responsive portion C. Through each of four intermediate portions to which the first to fourth load-responsive portions A-E are not connected, a rectangular through-hole 83 is formed from the outside to the through-bore 82. Owing to the provision of the rectangular through-holes 83, there are formed thin-walled portions 84,84' which are parallel to each other. A parallel plate structure unit $74C_{FZ}$ is formed by the thin-walled portions 84,84'. When the force component $F_z$ is applied in the direction of the z-axis to the parallel plate structure unit $74C_{FZ}$, the thin-walled portions 84,84' undergo deformations in response to the force component $F_z$, thereby detecting the force component $F_z$. The parallel plate structure unit $74C_{FZ}$ is deformed only by the force component $F_z$ but shows high rigidity against any other force components and moments.

The structure of the second load-responsive portion B takes a form symmetric to the structure of the first load-responsive portion A. The second load-responsive portion B has, in order from the outer wall portion 71b toward the central load-responsive portion C, a parallel plate structure $74B_{FX}$, a radial plate structure $75B_{MX}$ and a radial plate structure $75B_{MZ}$. On the other hand, the structure of the third load-responsive portion D is formed in such a way that it is equipped with a parallel plate structure $74D_{FY}$, a radial plate structure $75D_{MY}$ and a radial plate structure $75D_{MZ}$ in order from its outer wall portion 71d toward the central load-responsive portion C. In addition, the fourth load-responsive portion E has a structure symmetric to the structure of the third load-responsive portion D and is equipped, in order from the outer wall portion 71e toward the central load-responsive portion C, a parallel plate structure $74E_{FY}$, a radial plate structure $75E_{MY}$ and a radial plate structure $75E_{MZ}$. These parallel structures $74B_{FX},74D_{FY},74E_{FY}$ and radial plate structures $75B_{MX},75B_{MZ},75D_{MY},75D_{MZ}$ are equal to those contained in the first load-responsive portion A and their detailed explanation is thus omitted herein.

Let's now assume that a certain load has been applied, for example, to an unillustrated rigid body which is connected to the ring-shaped upper member 72. The load is then transmitted via the ring-shaped upper member 72, the first and second load-responsive portions A,B, the central load-responsive portion C, the third and fourth load-responsive portions D,E and the ring-shaped lower member 73 to another rigid body which is not shown in the drawing. In the course of transmission of the load, the parallel plate structure and radial plate structures in each of the load-responsive portions A-E detect the force components $F_x,F_y,F_z$ of the load in the directions of the x-axis, y-axis and z-axis as well as the moment components $M_x,M_y,M_z$ of the load about the x-axis, y-axis and z-axis.

Here, let's pay attention only to the force component $F_y$ of the load in the direction of the y-axis, out of the force and moment components of the load applied thereto. The force component $F_y$ is transmitted from the ring-shaped upper member 72 to the first and second load-responsive portions A,B. However, the parallel plate structures $74A_{FX},74B_{FX}$ and radial plate structures $75A_{MX},75A_{MZ},75B_{MX},75B_{MZ}$ are not deformed by the force component $F_y$ and the force component $F_y$ is transmitted as is to the central load-responsive portion C. The parallel plate structure unit $74C_{FZ}$ of the central load-responsive portion C is not deformed by the force component $F_y$. Thus, the force component $F_y$ is transmitted as is to the third and fourth load-responsive portions D,E. The force component $F_y$, which has been transmitted to the load-responsive portions D,E, is transmitted via the radial plate structures $75D_{MZ},75E_{MZ},75D_{MY},75E_{MY}$ to the parallel plate structures $74D_{FY},74E_{FY}$ without causing the radial plate structures to undergo any deformation. These parallel plate structures $74D_{FY},74E_{FY}$ are deformed by the force component $F_y$ with magnitudes and directions proportional to the force component $F_y$, thereby detecting the force component $F_y$. The forth component $F_y$, which has deformed the parallel plate structures $74D_{FY},74E_{FY}$, is then transmitted via the ring-shaped lower member 73 to the unillustrated rigid body. Other force and moment components are detected in the same manner by the corresponding parallel plate structures and radial plate structures.

In the above embodiment, the radial plate structures adapted to detect the moment component $M_z$ are provided in two sets, namely, one in the first load-responsive portion and another in the second load-responsive portion, and one in the third load-responsive portion and another in the fourth load-responsive portion. Obviously, the moment component $M_z$ can be detected by either one of the sets. Alternatively, the radial plate structure shown in FIG. 11(a) or 11(b) may be provided in place of the ring-shaped upper or lower member so that the radial plate structures $75A_{MZ}, 75B_{MZ}, 75D_{MZ}, 75E_{MZ}$ may be omitted. Furthermore, the central load-responsive portion may also be formed by two sets of parallel plate structures, namely, one parallel plate structure arranged in the direction of the y-axis and another parallel plate structure arranged in the direction of the x-axis, to detect the force component $F_z$.

As has been described above, the above embodiment contains the central load-responsive portion and the first to fourth load-responsive portions which extend out from the central load-responsive portion in the form of a cross and the parallel plate structure(s) and radial plate structure(s) and formed with their standard axes crossing perpendicularly to each of the load-responsive portions. Therefore, all the force components of an applied load in the directions of the axes and moment components of the applied load about the axes can be detected respectively by their corresponding specific parallel plate structures and radial plate structures, thereby making it possible to reduce interactions of detected signals to extremely low levels upon detecting such force and moment components. Since the detector is formed in its entirety by forming as a unitary structure portions having elasticity in their corresponding load directions in parts of a rigid body. It is possible to achieve good detection sensitivity and large strength and rigidity. Moreover, the load sensor has a symmetric structure as a whole, its rigidity is well-balanced in all directions, thereby providing so-called good "persistence" characteristics. Owing to the exclusion of attachment or connecting parts, the load sensor can avoid the occurrence of such undesirable characteristics as non-linear characteristics and/or hysteresis characteristics. It is thus clear that the load sensor may be designed so as to make each output from each axis thereof have linear characteristics. Signals, which pertain to interactions and may still be generated at extremely low levels, may be corrected by a simple conversion (a conversion making use of a linear equation). As a result, it permits to obtain detection signals with high accuracy within sufficiently-short operation time periods, even when applied, for example, in order to perform the real time control of a robot. The above-mentioned "persistence" characteristics are still better than those of the former embodiment, because the load sensor has a symmetrical structure as a whole and the standard axes are all coincided at the point P. Similar to the advantageous effects brought about by the previous embodiment, the load sensor of this embodiment still contains the radial plate structure or parallel plate structure although it may be omitted. Thus, it is possible to detect directly a moment or force component pertaining to the unomitted axis, thereby successfully avoiding occurrence of operational errors and providing correct values.

In the above first and second embodiments, there have been described 6-axis load sensors which are each adapted to detect the force and moment components of an applied load in the directions of all axes. As explained in the description on the above equations (i)–(iv), it is not always necessary to detect all force and moment components pertaining to x-axis, y-axis and z-axis in order to know the magnitude, direction and line of action of an applied force, different from the first and second embodiments. They may be determined by omitting any desired one of the six load component detection units, in other words, by a 5-axis load sensor. In order to construct such a 5-axis load sensor, it is only necessary to remove either one of the radial plate structures and parallel plate structures from the 6-axis load sensors of the first and second embodiments. The structure of such a 5-axis load sensor can be readily envisaged from FIGS. 8 and 12 through 15. Therefore, such a 5-axis load sensor is neither illustrated in the drawings nor described in the specification.

By means of the above 6-axis load sensor or 5-axis load sensor, it is possible to determine the magnitude, direction and line of action of a force applied to a body connected thereto. If there are certain limited conditions as for the position of point of action, or the magnitude or the direction of each applied force, one or more of radial plate structures and/or parallel plate structures may be removed in accordance with the limited conditions from the 6-axis or 5-axis load sensor so as to convert it into a 4-axis, 3-axis or 2-axis load sensor. Exemplary loads accompanied by such limited conditions that permit use of a 4-axis load sensor and 2-axis load sensor respectively will next be described briefly with reference to FIGS. 16 and 17.

Figure 1:
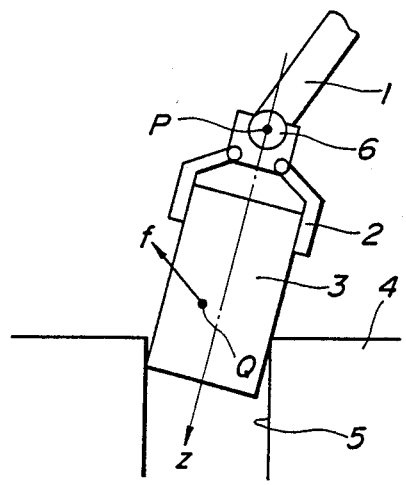
FIG. 1 is a side view showing an assembly operation carried out by an assembly robot.
Figure 2:
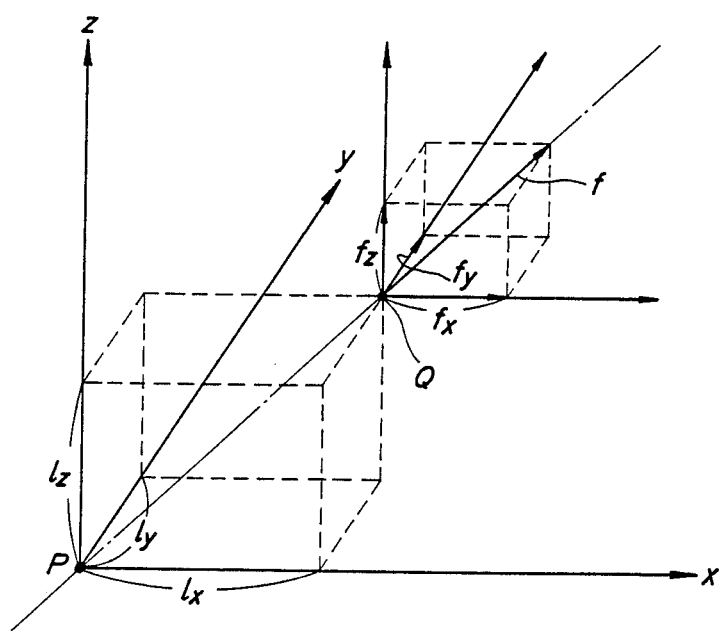
FIG. 2 is a vector diagram of a load shown in FIG. 1.
Figure 3:
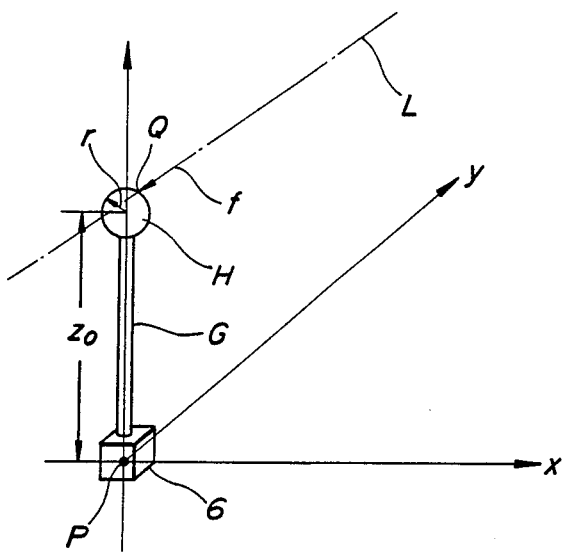
FIG. 3 is a perspective view showing a specific example of a body to which a force is applied.
Figure 4:
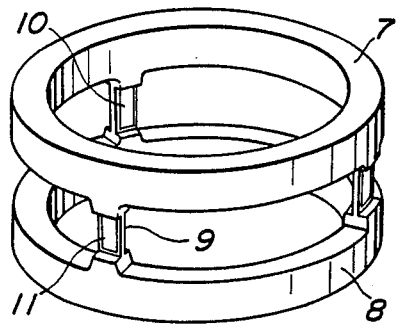
FIG. 4 is a perspective view of a conventional multi-axis load sensor.
Figure 16:
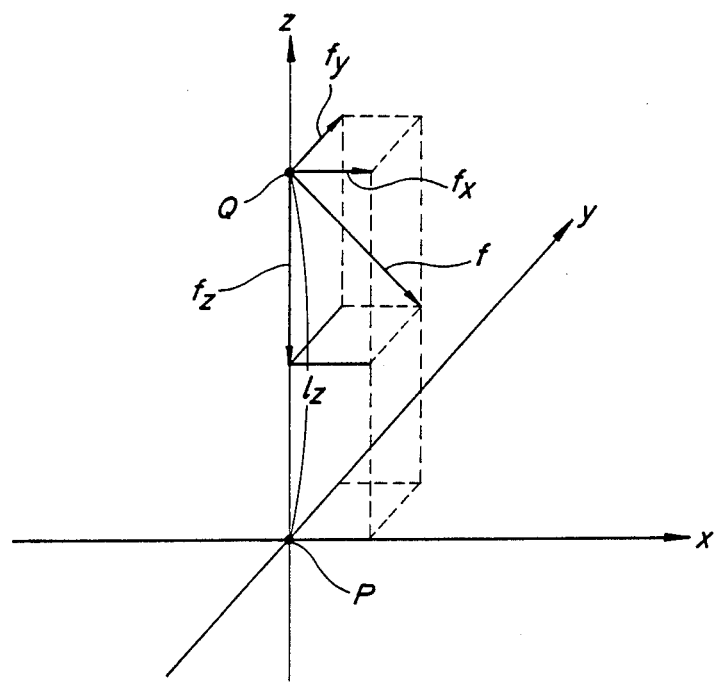
FIGS. 16 and 17 are vector diagrams showing exemplary situations accompanied by certain limited conditions.

FIG. 16 is a drawing illustrating a detection by a 4-axis load sensor. In FIG. 1, the point Q of action of a force f is selected at a location apart from the z-axis in order to assure the generality. In many instances, the point Q of action of a force f comes right on the z-axis. Thus, let's now assume a situation in which the point Q of action is located on the z-axis as shown in FIG. 16. Since $l_x=0$ and $l_y=0$ in this case, the following equations may be derived:

$$M_x = -F_y \cdot l_z$$

$$M_y = F_x \cdot l_z$$

$$M_z = 0$$

Accordingly, it is meaningless to detect the moment component $M_z$. Instead, it is necessary to detect the force component $F_z$. The load applied to the point Q of action and the position of the point Q of action can thus be determined provided that either three of the force components $F_x, F_y$ and moment components $M_x, M_y$ are detected. For example, the radial plate structures $50_{MZ}, 50_{MX}$ may be removed from the embodiment shown in FIG. 8 so as to form a 4-axis load sensor. In the embodiment shown in FIG. 12, the radial plate structures $75A_{MX}, 75B_{MX}, 75A_{MZ}, 75B_{MZ}, 75D_{MZ}, 75E_{MZ}$ may be omitted to form a 4-axis load sensor.

Figure 17:
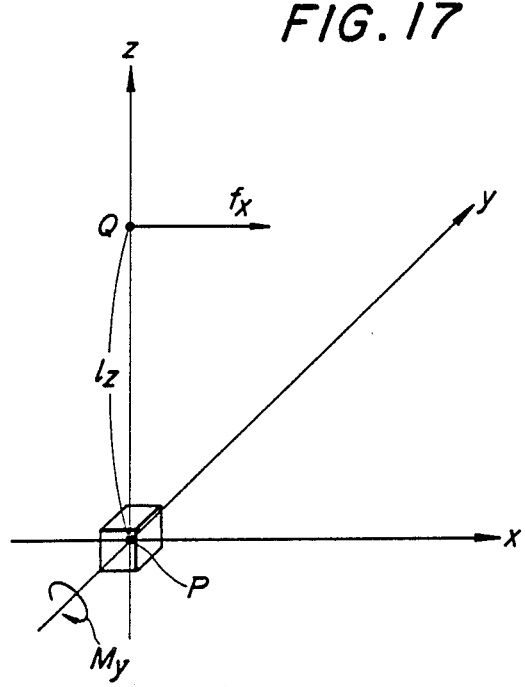

FIG. 17 illustrates detection by means of a 2-axis load detector. In this case, it may be contemplated a situation in which a load $f_x$ is applied in the direction of the x-axis to a point Q on the z-axis. Here, it is only necessary to determine the position $l_z$ of the point Q of action on the z-axis and the force $f_x$. It is therefore required only to determine the force component $F_x$ and moment component $M_y$. Namely, the load $f_x$ and position $l_z$ can be determined from the following relationship: $F_x = f_x$, and $M_y = -F_x \cdot l_z$. In the embodiment illustrated in FIG. 8, all plate structures other than the radial plate structure $50_{MY}$ and parallel plate structure $51_{FX}$ may be removed to form a 2-axis load sensor. In the case of the embodiment depicted in FIG. 12, all plate structures other than the parallel plate structures $74A_{FX}, 74B_{FX}$ and radial plate structures $75D_{MY}, 75E_{MY}$ may be omitted to form a 2-axis load sensor.

With reference to FIGS. 16 and 17, it has been described that the present invention is not necessarily omitted to a 6-axis load sensor or 5-axis load sensor but some of its parallel plate structures and radial plate structures may be omitted to form a 4-axis load sensor, 3-axis load sensor or 2-axis load sensor.

By studying in detail the embodiments of 2-axis to 4-axis load sensors in the above manner, the common construction of multi-axis load sensors of this invention will become clear. Namely, the common construction is summarized that a multi-axis load sensor has at least one radial plate structure and at least one of a parallel and radial plate structures having, as their standard axes, axes perpendicular to the standard axis of the former radial plate structure. It is clear that the magnitude and direction of a force may be calculated by force components $F_i$ only, for example, the force components $F_x, F_y$ or the force components $F_x, F_y, F_z$ but the line of action of the force cannot be determined by such force components $F_i$ only. Furthermore, it is also clear that, even if the moment component $M_x$ is detected, the line of action of the force cannot be specified by the moment component $M_x$ only, and that, even if a detection portion for the force component $F_x$ along the x-axis is added, the above construction is still unable to specify the line of action. Constructions each of which includes at least one detection element about a specific axis and at least one moment detection element and force detection element for axes different from the specific axes, namely, the above-described embodiments of the present invention are equipped with such function that they can determine the magnitude, direction and line of action of each acting force in all situations from situations in which certain limited conditions are applied to the acting force or line of action to other situations in which no limited conditions are applied.

In the first and second embodiments described above, their description was made using the orthogonal coordinate system as a coordinate system constituted by the x-axis, y-axis and z-axis as the orthogonal coordinate system is usual and practical. However, the coordinate system is not always required to be an orthogonal coordinate system. The basic function is not different at all even in the case of a multi-axis load sensor imaged in an oblique coordinate system. In the first and second embodiments, the standard axes of the parallel plate structures and radial plate structures are arranged perpendicularly to one another. The standard axes may however be allowed to cross along the axes of a given oblique coordinate system. It is possible to carry out desired detections without encountering any problem or inconvenience even by means of a multi-axis load sensor constructed in the above manner.

In the case of such an oblique coordinate system, it should obviously be borne in mind that the conditions defined as "the standard axes are perpendicular to one another" in the basic construction for the above described multi-axis load sensors according to this invention can be enlarged into such an expression as "the standard axes are neither coincident with nor parallel to one another".

I claim:

1. A multi-axis load sensor adapted to be connected between a first rigid member (52) (72) and a second rigid member (53) (73) so as to detect the magnitude, direction and point of action of a force to be transmitted between the first and second rigid members (52, 53) (72, 73), wherein said multiaxis load sensor comprises in combination:

a radial plate structure having a standard axis which extends in a prescribed direction and is adapted to detect a moment component to be produced about the standard axis by the force, wherein said radial plate structure comprising at least one pair of plates (43, 43') (81, 81') having a thicknesswise dimension smaller than a widthwise dimension thereof and arranged radially with respect to a prescribed point; and at least one parallel plate structure wherein said parallel plate structure comprises at least one pair of plates (33, 33') (77, 77') (84, 84') having a thicknesswise dimension smaller than a widthwise dimension thereof and arranged parallel to each other, said parallel plate structure having a standard axis which extends in a prescribed direction and being adapted to detect a force component to be produced in the direction of the standard axis by the force, and wherein the standard axis of said at least one parallel plate structure is neither coincident with nor parallel to the standard axis of said radial plate structure.

2. A multi-axis load sensor as claimed in claim 1, wherein the standard axes of said radial plate structure and said at least one parallel plate structure extend perpendicularly to each other.

3. A multi-axis load sensor as claimed in claim 1, wherein said radial plate structure and said at least one parallel plate structure each have a structure composed of two sets of paired plates arranged symmetrically; and in a composite structure formed of all of said plate structures, the standard axis of said radial plate structure and the standard axis of said at least one parallel plate structure cross at one point.

4. A multi-axis load sensor as claimed in claim 3, wherein in the composite structure, said crossing standard axes cross perpendicularly at said one point.

5. A multi-axis load sensor as claimed in claim 3, wherein the composite structure is formed of a block having a substantially cross-like cross-section defined by a central section and four elongated wing sections, and wherein two sets of paired plates forming said radial plate structure and two sets of paired plates forming said at least one parallel plate structure are formed by through-holes provided respectively in said wing sections in a direction either parallel with or perpendicular to a central axis of said block.

6. A multi-axis load sensor as claimed in claim 5, wherein the block is equipped with first connecting means arranged between mutually-opposing outer end portions of two of said elongated wing sections and is adapted to connect the sensor to one of the first and second rigid members and second connection means arranged between mutually-opposing outer end portions of the other two of said elongated wing sections and adapted to connect the sensor to the other rigid member.

7. A multi-axis load sensor as claimed in claim 6, wherein the block, first connection means and the second connection means have an integral structure formed from a single block.

8. A multi-axis load sensor as claimed in claim 3, wherein the composite structure is formed of a block having a central section defining at least one parallel plate structure by a through-bore which extends along a central axis of the block, and by through-holes each of which extends through the central section from an area between adjacent elongated wing sections of the block to the throughbore.

9. A multi-axis load sensor as claimed in claim 1, wherein said radial plate structure and said at least one parallel plate structure are formed in a stacked structure with a connection portion interposed therebetween, which stacked structure extends along one of the standard axes.

10. A multi-axis load sensor as claimed in claim 9, wherein the stacked structure is an integral structure formed from a single block.

11. A multi-axis load sensor as claimed in claim 3, wherein the composite structure is an integral section formed from a single block.

12. A multi-axis load sensor adapted to be connected between a first rigid member (52) (72) and a second rigid member (53) (73) so as to detect the magnitude, direction and point of action of a force to be transmitted between the first and second rigid members (52,53) (72,73), wherein said multi-axis load sensor comprises in combination:
a first radial plate structure having a standard axis, which extends in a prescribed direction and is adapted to detect a moment component to be produced about the standard axis by the force, wherein said first radial plate structure comprises at least one pair of plates (43,43') (81,81') having a thicknesswise dimension smaller than a widthwise dimension thereof and arranged radially with respect to a prescribed point; and
a second radial plate structure of the same type as said first radial plate structure, wherein the standard axis of said second radial plate structure is neither coincident with nor parallel to the standard axis of said first radial plate structure.

13. A multi-axis load sensor as claimed in claim 12, wherein the standard axes of said first radial plate structure and said second radial plate structure extend perpendicularly to each other.

14. A multi-axis load sensor as claimed in claim 12, wherein said first radial plate structure and said second radial plate structure are formed in a stacked structure with a connection portion interposed therebetween, which stacked structure extends along the standard axis of one of said first radial plate structure and said second radial plate structure.

15. A multi-axis load sensor as claimed in claim 12, wherein said first radial plate structure and said second radial plate structure have a structure composed of two sets of paired plates arranged symmetrically; and in a composite structure formed of all of said plate structures, the standard axis of said first radial plate structure and the standard axis of said second radial plate structure cross at one point.

16. A multi-axis load sensor as claimed in claim 15, wherein in the composite structure, said crossing standard axes cross perpendicularly at said one point.

17. A multi-axis load sensor as claimed in claim 15, wherein the composite structure is formed of a block having a substantially cross-like cross section defined by a central section and four elongated wing sections, and two sets of paired plates forming said first radial plate structure and two sets of paired plates forming said second radial plate structure are formed by throughholes provided respectively in said wing sections in a direction either parallel with or perpendicular to a central axis of said block.

18. A multi-axis load sensor as claimed in claim 17, wherein said first radial plate structure is formed in a stacked structure which extends along one of the standard axes.

19. A multi-axis load sensor as claimed in claim 18, wherein the stacked structure is an integral structure formed from a single block.

20. A multi-axis load sensor as claimed in claim 15, wherein the composite structure is an integral structure formed from a single block.

21. A multi-axis load sensor as claimed in claim 17, wherein the block is equipped with first connecting means arranged between mutually-opposing outer end portions of two of said elongated wing sections and adapted to connect the sensor to one of the first and second rigid members and second connection means arranged between mutually-opposing outer end portions of the other two of said elongated wing sections and adapted to connect the sensor to the other rigid member.

22. A multi-axis load sensor as claimed in claim 21, wherein the block, the first connection means and the second connection means have an integral structure formed from a single block.

23. A multi-axis load sensor adapted to be connected between a first rigid member (52) (72) and a second rigid member (53) (73) so as to detect the magnitude, direction and point of action of a force to be transmitted between the first and second rigid members (52, 53) (72, 73) wherein said multi-axis load sensor comprises in combination:
a first radial plate structure having a standard axis, which extends in a prescribed direction and is adapted to detect a moment component to be produced about the standard axis by the force, wherein said first radial plate structure comprises at least one pair of plates (43, 43') (81, 81') having a thicknesswise dimension smaller than a widthwise dimension thereof and arranged radially with respect to a prescribed point; and
at least one plate structure wherein said at least one plate structure comprises at least one pair of plates (33, 33') (77, 77') (43, 43') (81, 81') having a thicknesswise dimension smaller than a widthwise dimension thereof, said at least one plate structure having a standard axis which extends in a prescribed direction wherein the standard axis of said at least one plate structure is neither coincident with nor parallel to the standard axis of said first radial plate structure.

24. A multi-axis load sensor as claimed in claim 23, wherein the standard of axis of said first radial plate structure and that of said at least one plate structure extend perpendicularly to each other.

25. A multi-axis load sensor as claimed in claim 23, wherein said first radial plate structure and said at least one plate structure are composed of two sets of paired plates arranged symmetrically; and in a composite structure formed of said first radial plate structure and said at least one plate structure, the standard axis of said first radial plate structure and the standard axis of said at least one plate structure cross at one point.

26. A multi-axis load sensor as claimed in claim 25, wherein the composite structure is an integral structure formed from a single block.

27. A multi-axis load sensor as claimed in claim 25, wherein in the composite structure, the standard axis of said first radial plate structure and the standard axis of said at least one plate structure cross perpendicularly at said one point.

28. A multi-axis load sensor as claimed in claim 25, wherein the composite structure is formed of a block (A, B, C, D, E) having a substantially cross-like cross-section, and two sets of paired plates forming said first radial plate structure and two sets of paired plates forming said at least one plate structure are formed by through-holes provided respectively in said block (A, B, C, D, E).

29. A multi-axis load sensor as claimed in claim 28, wherein said at least one plate structure comprises parallel plate structures constructed in a central section of the block by through-holes.

30. A multi-axis load sensor as claimed in claim 28, wherein said block is equipped with first connection means arranged between mutually-opposing outer end portions of two elongated wing sections of said block and adapted to connect the sensor to one of the first and second rigid members and second connection means arranged between mutually opposing outer end portions of the other two elongated wing sections of said block and adapted to connect the sensor to the other rigid member.

31. A multi-axis load sensor as claimed in claim 30, wherein the block, the first connection means and the second connection means have an integral structure formed from a single block.

32. A multi-axis load sensor as claimed in claim 23, wherein said first radial plate structure and said at least one plate structure are formed in a stacked structure with a connection portion interposed therebetween, which stacked structure extends along one of the standard axes.

33. A multi-axis load sensor as claimed in claim 32, wherein the stacked structure is an integral structure formed from a single block.

* * * * *